United States Patent
Soni et al.

(10) Patent No.: US 11,222,630 B1
(45) Date of Patent: Jan. 11, 2022

(54) DETECTING FALSE ACCEPTS IN A SHOPPING DOMAIN FOR HANDLING A SPOKEN DIALOG

(71) Applicant: Amazon Technologies, Inc., Seattle, WA (US)

(72) Inventors: Ajay Soni, Seattle, WA (US); Jingqian Zhao, Seattle, WA (US); Ruiqi Luo, Seattle, WA (US); Adam Kalman, Seattle, WA (US); Prathap Ramachandra, Seattle, WA (US); Liu Yang, Seattle, WA (US); Simone Filice, Seattle, WA (US); Ponnu Jacob, Seattle, WA (US); Amitpal Singh Bhutani, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 174 days.

(21) Appl. No.: 16/576,115

(22) Filed: Sep. 19, 2019

(51) Int. Cl.
*G10L 15/22* (2006.01)
*G10L 15/187* (2013.01)
*G10L 15/16* (2006.01)

(52) U.S. Cl.
CPC ............ *G10L 15/187* (2013.01); *G10L 15/16* (2013.01); *G10L 15/22* (2013.01); *G10L 2015/227* (2013.01)

(58) Field of Classification Search
None
See application file for complete search history.

(56) References Cited

U.S. PATENT DOCUMENTS

| | | | |
|---|---|---|---|
| 9,424,840 B1* | 8/2016 | Hart | G10L 15/22 |
| 2014/0316764 A1* | 10/2014 | Ayan | G10L 15/22 |
| | | | 704/9 |
| 2016/0148612 A1* | 5/2016 | Guo | G06F 40/237 |
| | | | 704/257 |
| 2017/0083825 A1* | 3/2017 | Battersby | G06N 20/10 |

(Continued)

FOREIGN PATENT DOCUMENTS

| | | | |
|---|---|---|---|
| CN | 109389974 A | * | 2/2019 |
| CN | 109688281 A | * | 4/2019 |

OTHER PUBLICATIONS

Translation of CN-109389974-A, A Voice Operation Method And Device (Year: 2019).*

(Continued)

*Primary Examiner* — Daniel C Washburn
*Assistant Examiner* — Athar N Pasha
(74) *Attorney, Agent, or Firm* — Polsinelli PC (57) ABSTRACT

A new model is introduced into a particular domain that receives a routing of a dialog from a speech processing component. The speech processing component is engaged in the dialog with a user and the speech processing component routes the dialog to the particular network-based domain according to a determination by the speech processing component that the user has an intent to perform a task handled by the domain. The model detects, at the domain, whether the user has the proper intent associated with the domain by using the user utterance in its entirety to yield a detection result. When the user does not have the proper intent based on the detection result, the domain drops the user utterance.

20 Claims, 4 Drawing Sheets

(56) References Cited

U.S. PATENT DOCUMENTS

2020/0135180 A1* 4/2020 Mukherjee .............. G10L 15/22
2021/0082400 A1* 3/2021 Vishnoi ................ G06F 40/284

OTHER PUBLICATIONS

Translation of CN 109688281 A, An Intelligent Voice Interactive Method And System (Year: 2019).*
Verwimp (Verwimp, Lyan, Joris Pelemans, and Patrick Wambacq. "Character-word LSTM language models." arXiv preprint arXiv: 1704.02813 (2017).) (Year: 2017).*

* cited by examiner

DETECTING FALSE ACCEPTS IN A SHOPPING DOMAIN FOR HANDLING A SPOKEN DIALOG

BACKGROUND

This disclosure relates to machine learning algorithms and systems. Devices have been developed for home or other use to enable interaction with the user via a spoken dialog. Examples of such devices include Amazon Alexa and Google Home. These devices communicate with a central speech processing component to enable users to speak to perform tasks such as making a phone call, asking for music to be played, or initiating a shopping experience. In some scenarios, the speech processing component will analyze a user utterance to determine the intent of the user. The speech processing component can include automatic speech recognition modules and/or natural language understanding modules to determine the user intent. The computing power and knowledge contained within the speech processing component however is often limited. The speech processing component, based on the determined intent, will route the dialog to one of a number of different network-based domains for handling the specific task. For example, the speech processing component may route the dialog to a shopping domain if the speech processing component determines that the user intent is related to shopping or a communication domain if the intent is related to initiating a telephone call. The speech processing component makes an irreversible decision to route the dialog to a specific domain. In some cases, the routing decision is incorrect and the user experience can thereby be frustrating as the incorrect network-based domain is attempting to continue a dialog for a user intent that does not match the network-based domain programming.

BRIEF DESCRIPTION OF THE DRAWINGS

Various embodiments in accordance with the present disclosure will be described with reference to the drawings, in which.

While the disclosed technology is described herein by way of example for several embodiments and illustrative drawings, those skilled in the art will recognize that the disclosed technology is not limited to the embodiments or drawings described herein. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must). Similarly, the words "include", "including", and "includes" mean including, but not limited to. Any feature from any embodiment or example can be utilized with any other feature from another embodiment or example.

DETAILED DESCRIPTION

This disclosure provides a novel approach to improving the customer experience related to spoken dialog interactions. In some configurations, a home-based device including a speaker, microphone and processing components for engaging a user in a spoken dialog. A network-based speech processing component is connected over a network with the home-based device and provides speech processing services to enable the spoken dialog. The speech processing component in some cases incorrectly determines the intent of the user and routes the dialog to the wrong network-based domain for handling a specific user experience. For example, when the home-based device is engaged in a dialog with the user and the speech processing component determines that the user intent is to purchase a product, the device may communicate speech data to the network-based speech processing component that will route that dialog to a network-based shopping domain for continuing the dialog with the expectation that the user desires to make a purchase.

An incorrect routing decision can be called a "false accept." For example, if the user desires to listen to music and says "Play Billy Jean by Michael Jackson", the speech processing component may interpret the phrase "by Michael Jackson" as "buy Michal Jackson" and route the dialog to a network-based shopping domain which expects to handle a discussion about a purchase of a song. In other words, the speech processing component interpreted a non-shopping utterance as a shopping related utterance and routed the dialog to be handled by a shopping domain which is not designed for handling a request to listen to music. The customer experience can thereby be less optimal as dialog errors may seek to lead the user to a purchase transaction. The disclosure introduces a new false accept detector which is associated with the network-based domain and which is designed to reduce false accepts or to improve the handling of false accepts.

We note herein that the primary examples provided will relate to the speech processing component routing a dialog to the shopping domain. However, this disclosure is broad enough to encompass any domain having a particular task. For example, one domain might relate to playing music while another domain might relate to communication tasks such as a telephone calls or texts. Other domains may be programmed to handle the control of home appliances or devices. Thus, the scope of this disclosure should apply to any domain developed for handling a specific task rather than being limited to a network-based shopping domain.

Figure 1:
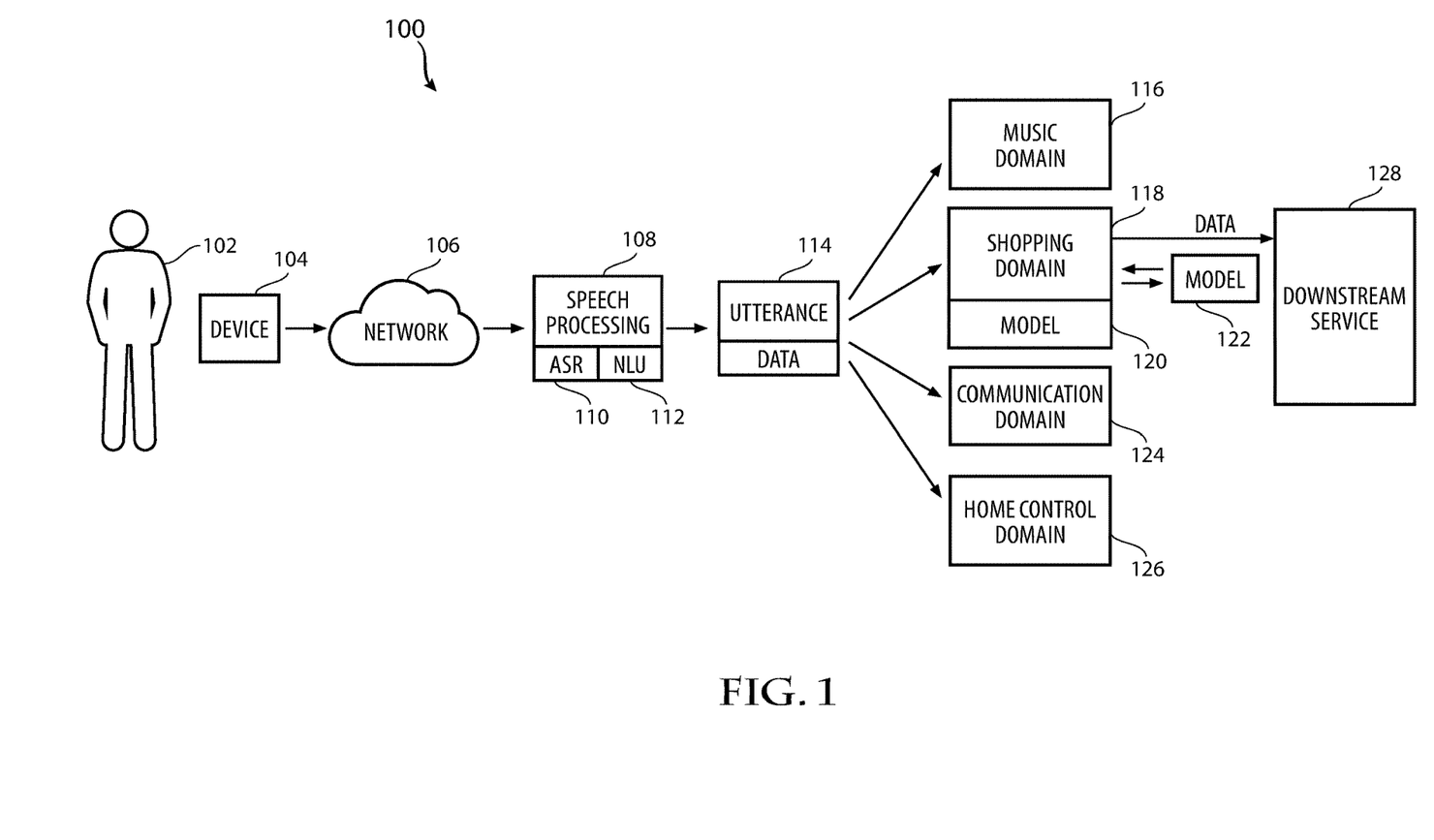
FIG. 1 illustrates an example device communicating with a group of network-based domains.

FIG. 1 illustrates the basic framework 100 associated with this disclosure. A device 104 operates in a location such as the user's home. An example device can be Google Home or Amazon Alexa. The device 104 can of course be any device and is not limited to a device configured in the home. Generally speaking, the device 104 is capable of voice interaction and enables users 102 to articulate commands in natural language and accomplish tasks such as requesting music, making a to-do list, requesting weather reports, or making purchases. Other tasks can include controlling devices within the home such as turning lights on or controlling appliances and heating or air conditioning systems. In one example, the device 104 communicates through a network such as the Internet 106 with a centralized artificial intelligence or machine learning speech processing component, node or network layer 108 that can include an automatic speech recognition component 110 and/or a natural language understanding component 112. In another aspect not shown in FIG. 1, such components might be configured locally on the device 104. The location of such speech processing components and whether they reside on locally on device 104 or are network-based is not material to this disclosure. In one aspect as shown in FIG. 1, the speech processing component 108 processes the speech and make an intent determination. In another aspect, the processes can be shared across the device 104 and the speech processing component 108, or might be local to the device 104.

As the number of available tasks which the user 102 can accomplish has grown, the infrastructure 100 has evolved as well. While the infrastructure 100 initially included a single network-based server to receive a transition of a dialog from the device 104, given the increased number of available tasks, there are now multiple different network-based domains. The device 104 will interact with the user 102 in a voice dialog and the speech processing component 108 can make a determination regarding the intent of the user 102. If the intent is determined to be a particular type of intent, for example, the speech processing component 108 will route the dialog or the utterance to the corresponding domain 116, 118, 120, 126 associated with that intent. For purposes of this disclosure, the number of domains is not material. Each domain includes a speechlet which represents the components in the respective domain for managing the dialog with the user through the device 104 to provide information or to achieve the tasks associated with the respective domain.

The speech processing component 108 can include different data 114 to pass to the respective domain as a result of its analysis. For example, the routing decision might include several features such as a determination of the proper domain for the utterance such as shopping 118, smart home 126, communication 124, and can include the utterance itself, confidence scores, other metadata, and so forth. This data can be used by the model 120/122 in detecting false accepts.

The "smart home" domain 126 can relate to the ability of the user to control components within a home such as appliances, lights, security systems, media systems, and so forth through voice commands. The information provided from the speech processing component 108 can also include the utterance itself 114. The data can include an intent associated with the specific domain such as in a shopping scenario, a desire to search, a desire to buy an item or to check a previous order. The data 114 can include slots with additional information such as a specific identification of an item, and order number, a price range, a person to be called, a device within the home to be controlled, and so forth. The data 114 can also include a confidence level such as a numerical ASR score and the speech processing component 108 can produce a hierarchy including a list of hypothetical predictions or solutions. The data 114 can also include binary data such as a contextual signal, data about a previous interaction, and so forth. The data 114 can include categorical information such as a device type related to device 104. The routing decision can be based on the intent having the highest confidence value from the list.

The separate domains were developed to improve the customer experience such that each domain is programmed with separate software to focus on a proper interactive experience for the user having that particular intent. The speech processing component 108, however, often has limited knowledge or processing power when evaluating user utterances to determine intent. The speech processing component 108 might receive some data and utilize some models such as finite state transducer models or specific rules for making intent determinations and routing decisions. The routing decisions are irreversible in that once a user is continuing the dialog having been routed to a particular domain, that particular domain is now communicating with the user and that transition cannot be reversed. Sometimes the routing decisions are incorrect which resulting in false accepts at a respective domain. Example domains include a music domain 116, a shopping domain 118, a communication domain 124, and home control domain 126. Of course other domains can be contemplated as well and this disclosure does not require or rely on a specific functional domains.

A new model for handling false accepts is introduced into the respective domain 118. As shown in FIG. 1, the shopping domain 118 is modified to include a model 120 embedded in the shopping domain or, as an alternate, a separate model 122 that can be called via an application programming interface or other protocol to evaluate a received utterance 114 to determine if it is a false accept or not. Typically, a file having data associated with the utterance 114 is transmitted from the speech processing component 108 to the respective domain 116, 118, 124, 126. False accepts result in dissatisfaction by customers as they do not get the desired experience. False accepts can add noise and lower the quality of shopping metrics such as a customer action rate, downstream impact, a monthly activation rate or a shopping activation rate. These are example metrics which can all be impacted when a routing decision is wrong and a particular network-based domain that is configured to handle a particular intent has received a routing of a dialog that has a different intent.

The focus of this disclosure is to reduce false accepts on the network-based domain side of the dialog management by introducing the new model 120/122 that can be used to detect false accepts and perform specific corrective actions. The model 120/122 can be a machine learning model or a neural network model which predicts whether a given utterance should belong to a particular network-based domain. In one aspect, the model 120/122 performs another check on the intent of the user beyond the determination made at the speech processing component 108. In one aspect, the model 120/122 does not perform an initial decision on intent and requires a previous intent decision by a speech processing component 108 to operate.

One building block for the model is a long short-term memory (LSTM) artificial recurrent neural network architecture which uses a concatenation of word-level features associated with the user utterance and character-level features associated with the utterance. Word-level features can relate to finding the constituent morphemes and/or morphs of each word in the utterance. The model can combine both the word level features as well as the character level features and pass all of the features to a main long short-term memory layer which can make a final prediction of whether the utterance is been routed correctly to the proper network-based domain. This approach can in one scenario involve the main or multiplicative LSTM is used to produce a sentence or phrase representation. There can be an average feature vector that represents the sentence or phrase with a last feature vector representing an ending notation like a period. The end result of the processing is an utterance-level classification. See, for example, "A Context-based Approach for Dialog Act Recognition using Simple Recurrent Neural Networks" by Bothe et al, ACL Anthology, 2018, incorporated herein by reference.

In one aspect, the model 120/122 provides a secondary analysis of the utterance to determine intent. Generally speaking, the intent is first determined by the speech processing component 108 according to a first protocol or algorithm. That algorithm might look for specific product words or portions of the utterance for clues as to the user intent. Once the dialog is routed to the network-based domain, the model 120/122 applies a second protocol or algorithm to confirm the intent or to determine that it is a false accept. The second protocol or algorithm might, for example, evaluate an entire utterance rather than simply looking for keywords. This can involve utterance-level classification as described above or using other approaches. The second protocol might involve applying more computing power to perform a more robust analysis of the utterance and to thereby adjust confidence scores in what the intent is. The second protocol might be able to access more personal data about the user such as a purchasing history or other historical data particular to that domain.

In one aspect, the model 120/122 might determine a type of intent determination algorithm at the speech processing component 108 and select a second model that differs in type to provide a diversity of models applied to an intent determination as part of the false accept detection process.

The second protocol might apply a different machine learning algorithm or multiple machine learning algorithms in order to more deeply evaluate the utterance for its intent. The second protocol might include a timing component in which an amount of time is identified by which the decision needs to be made in order to maintain the dialog slow. For example, if the initial utterance or dialog has longer pauses, the network-based domain might have an extra second to perform a deeper analysis on the utterance to determine its intent. Or, if the user speaks more quickly, the system may apply a different algorithm to more quickly evaluate whether the routing is a false accept.

Actions taken by the respective domain 118 can include the blacklisting an utterance or routing the dialog to the proper domain. For example, the respective domain model 120/122 might blacklist the phrase "buy michael jackson" or more generically "buy [artist name]" in that the training of the model indicates that that phrase typically does not indicate a desire to purchase the artist but is related to a request to listen to music "by" that artist name. In such a scenario, the system will drop the utterance having the blacklisted phrase and respond by saying something like "I don't understand, please rephrase your request."

In one aspect, the model 120/122 uses the entire utterance from the user 102 when making a decision regarding whether the routing was correct. Other machine learning models may just look at names such as "Harry Potter" and determine that they are related to a shopping domain. However, the model 120/122 would listen to the broader utterance such as "listen to harry potter" or "shop harry potter" and would assign a different or higher shopping confidence score than to just the words "harry potter".

In one aspect, the model 120/122 can be a binary domain classifier which means that it can predict whether the given utterance belongs either to the respective domain or not. If the utterance does not belong to the specific domain, it would be deemed a false accept. In other aspects, the model 120/122 can be expanded to cover more intents as well as more locales in that it can be more multidimensional rather than binary. The models can be implemented in any of the domains and not just the shopping domain 118. The model 120/122 can be developed using collected data of the model output for certain sets of utterances and their annotations. In the shopping domain, the model 120/122 could be applied to process utterances to distinguish sub-intents within the shopping domain 118. For example, the model 120/122 could identify an intent to buy an item or an intent to add the item to a cart. Thus, the model can provide an intent-level granularity and not just a binary classification decision regarding whether the routing was correct.

Thus, in one scenario, the model 120/122 can be characterized as a multiclass intent classifier. The possible outcomes can include a determination that the utterance has a non-shopping intent and is thus a false accept or the output could identify a specific intent related to the shopping domain 118. For example, the following classes or intents could be output for particular utterance: a buy-item intent, a search-item intent, a check-price intent, an add-to-cart intent or add-to-order intent, a browse-to-cart intent or a browse-to-order intent, a cancel-order intent or a check-order-status intent. When one of these intents is output by the model 120/122, it would indicate that the utterance was properly routed to the shopping domain 118 as each of these outputs relate to shopping.

In one aspect, the model 120/122 can detect the error in spoken language understanding or natural language understanding in the routing decision and output an "SLU error" signal downstream to other services 128. Downstream services 128 can represent any component that continues with a user dialog to perform other tasks such as handling a payment, managing a delivery of a product, or continuing with the specific domain tasks, and so forth. Typically the downstream servers 128 are included within each respective domain 116, 118, 124, 126. In another aspect, the downstream service 128 might be a separate component from a respective domain. Part of this disclosure includes the concept of transmitting a signal which indicates or identifies the output of the model 120/122 to a downstream service 128 which can then utilize that information to improve the performance of the functions of the downstream service. It would be the response ability of the downstream service 128 to make use of that signal to improve the customer experience. For example, if an NLU error resulted in a false accept conclusion that the user wanted to add an item to their shopping cart, the downstream service 124, which might be involved with managing a user shopping cart, should not add an unwanted item to their shopping cart upon receiving the false accept signal from the shopping domain 118 (or directly from the model 120/122). Thus, the network-based domain can improve the customer experience by introducing the new model 120/122, performing an analysis of one or more utterances to determine whether there was a false accept or to make a determination that a more detailed level of granular verity, and then passing that decision and a signal to a downstream service 128.

The downstream service 128 might also receive the more granular intent information. The data received might confirm that the overall shopping intent was correct in the original routing and the false accept detector also determined that the user desires to add the item to their shopping cart and check out later after some additional shopping. This more granular level information can also help to shape and improve dialogs provided by downstream services.

In another example, the speech processing component 108 might properly have performed automatic speech recognition 110 but the NLU component 112 failed to determine the proper intent. The speech processing component 108 might have an item-name-based model that will look at an item name (such as a particular product which is identified in the user utterance) and give a high confidence score to a shopping intent. In this scenario, an item-based model will look for specific named items in a user utterance and not the entire utterance. The model 120/122 associated with the shopping domain 118 can utilize more information from the full utterance and thus the shopping domain 118 will see the SLU result in predicting that the full utterance was misclassified as having a shopping intent. The shopping domain 118 will receive a document which contains information in a particular format. The document can be an XML (Extensible Markup Language) file, a JSON (JavaScript Object Notation) file or any other format that is desirable. The file can include data such as information associated with the confidence score of the intent determined by the speech processing component 108 and can also include the full utterance by the user 102. The domain 118 and can evaluate the utterance and will determine that the NLU result 106 was misclassified as a shopping intent. Thus, the model 120/122 will evaluate independently the intent associated with the (entire) utterance and can output a signal indicating that the NLU determination was in error or not and trust that the downstream service 128 within the domain 118 will take appropriate action. In one example, the downstream service 128 will not give the user 102 a shopping offer for a particular item name as the model 120/122 may conclude that the user does not want to shop.

Certain processing modules may be discussed in connection with this technology. These modules can relate to a specific domain, a model or a downstream service 128. In one example configuration, a module may be considered a service with one or more processes executing on a server or other computer hardware. Such services may be centrally hosted functionality or a service application that may receive requests and provide output to other services or customer devices. For example, modules providing services (such as for any of the specific domains or downstream services in FIG. 1) may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed. This can include interactions with a specific domain 116, 118, 124, 126 from a speech processing component 108. In one aspect, the specific domain 118 can be considered a special-purpose computer system which includes a processor and computer components programmed to perform the algorithms disclosed herein.

Figure 2:
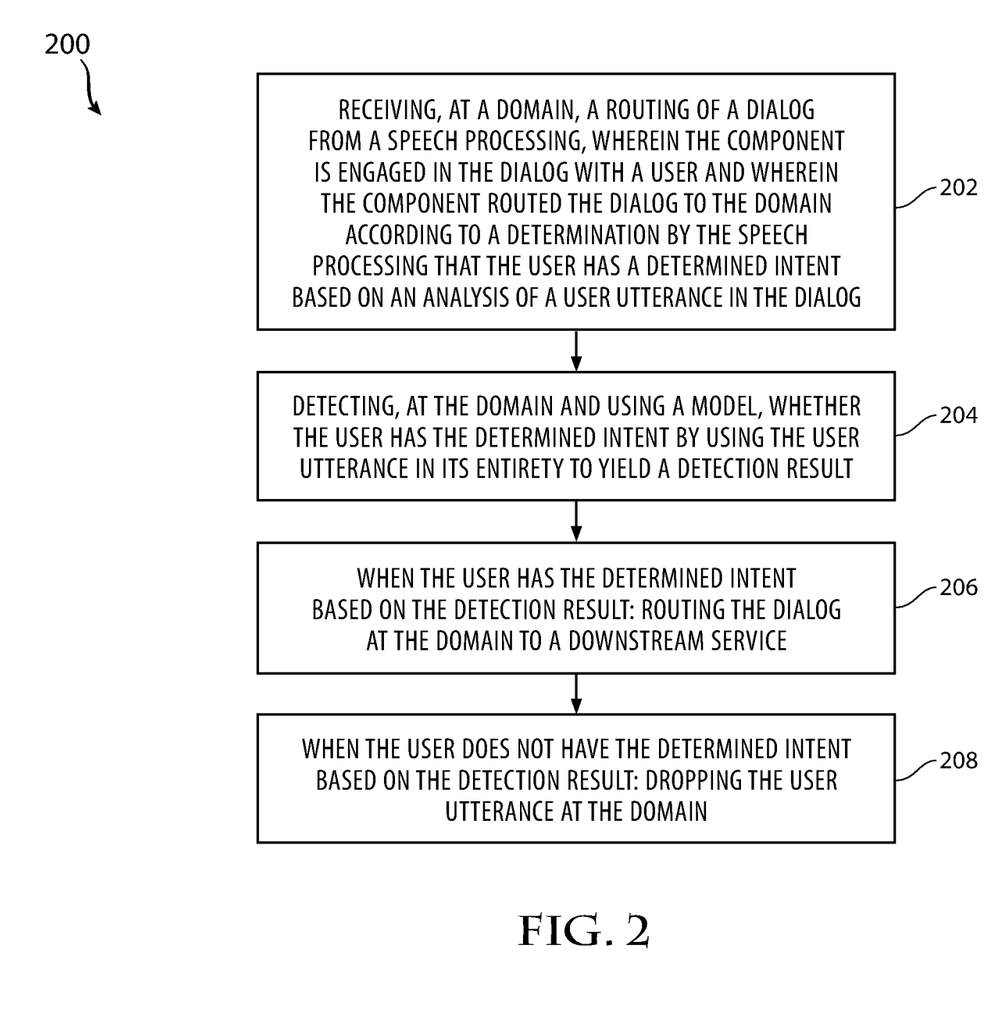
FIG. 2 illustrates a method example.

FIG. 2 illustrates a method example. The method is practiced in this example from the standpoint of a particular domain, such as the shopping domain 118. The reference to the shopping domain can also be expanded to encompass any particular or respective domain with its associated functionality. The method can include receiving, at a particular domain, a routing of a dialog from a speech processing component, wherein the speech processing component is engaged in the dialog with a user and wherein the speech processing component routed the dialog to the particular domain according to a determination by the device that the user has a determined intent based on an analysis of a user utterance in the dialog (202), and detecting, at the particular domain and using a neural network or other machine-learning model, whether the user has the determined intent by using the user utterance in its entirety to yield a detection result (204). The speech processing component 108 can evaluate the user utterance according to an algorithm such as determining whether keywords are spoken which relate to products, for example. The speech processing component 108 would then identify a determined intent of the user based on the algorithm and make a routing decision to a domain according to the determined intent. When the user has the determined intent based on the detection result: routing the dialog at the particular domain to a downstream service (206). This can include passing the dialog within the domain to a downstream service 128 for continuing to achieve tasks within the context of the determined intent. There are a number of different potential dialog services (within the domain 118) that can receive the dialog according to the determined intent. In one aspect, there can be a single downstream service that automatically receives the dialog following the false accept detection process. Optionally, when the user does not have the determined intent based on the detection result: dropping the user utterance at the particular domain (208). Dropping that message can include selecting a particular utterance from the system to play to the user indicating that the system does not understand their intent. The particular system utterance associated with dropping the user utterance can be chosen based on the detection result, such as its confidence level, or a predicted user intent. The speech processing component 108 can apply a first algorithm to determine the user intent at that stage and the particular domain 118 can apply a second algorithm to confirm that intent or to determine if there has been a false accept. These algorithms can be of different types, such as one algorithm that spots keywords and makes a routing decision at the speech processing component 108 to route the dialog to a particular platform. Then, at the respective domain 118, a different type of algorithm in one aspect, such as a full utterance classification algorithm, detects whether there has been a false accept, confirms the user intent and takes additional actions based on the detection result. The algorithms might also of the same type in one aspect. Once the user intent is confirmed by this second application of an algorithm (which can be the same or of a different type), and the intent is confirmed, the dialog continues within the domain 118 through a downstream service 128 or from a chosen downstream server from a group of services. The detected user intent via application of the model 120/122 can be passed as metadata to the downstream service 128 which can utilize that data in its dialog management. If the algorithm is of the same type that is applied for determining at the respective domain 118 whether there was a false accept, the fact that the domain 118 can have additional data about the user that can be fed into the model 120/122 can help to confirm the intent or identify a false accept.

The shopping domain 118 can be selected by the speech processing component 108 from a plurality of potential domains to which the dialog can be routed. The model can include a long short-term memory artificial recurrent neural network architecture which uses a concatenation of word-level features associated with the user utterance and character-level features associated with the utterance. It is noted that the particular type of machine learning or artificial intelligence modeling associate with the model 120/122 can vary. For example, deep learning algorithms represent a subclass of machine learning that analyzes data through layers. Deep learning can be characterized as a new term for artificial neural networks. The various approaches to machine learning algorithms can be applied to the present technology and to the development of the model 120/122. For example, artificial neural networks, decision trees, support vector machines, Bayesian networks, and genetic algorithms of the various ways of training those algorithms can be applied to the present disclosure.

The detection result from implementing the model 120/122 can identify an error in a natural language understanding intent output associated with the user utterance either as a binary classification or at a more granular level to either identify the intent as a fault accept. In one aspect, the shopping domain 118 calls the neural network model 120/122 in order to detect whether the device produced a false accept of the user utterance as having the purchasing intent. The file 114 associated with an utterance (XML, JSON or other file format) can be passed to the model 120/122 for evaluating and analysis such that the model 120/122 can return a result to the domain 118. An application programming interface can provide a protocol for communicating requests and receiving responses from the model 120/122.

When the user does not have the purchasing intent based on the detection result and the method can include dropping the user utterance at the shopping domain 118. In one aspect, dropping of the user utterance at the shopping domain can include blacklisting at least a part of the user utterance in the neural network model or can be the result of a blacklisted word or group of words. Blacklisting at least the part of the user utterance further can include applying a regular expression-based rule within the neural network model 120/122. A system utterance can be provided as part of the dropping the user dialog, such as "we don't understand that request, please state it a different way." The system can record detection decisions that lead to continuing the dialog at the domain or for dropping an utterance for future reporting, revision of the detection model 120/122 or other models, or for other purposes.

Figure 3:
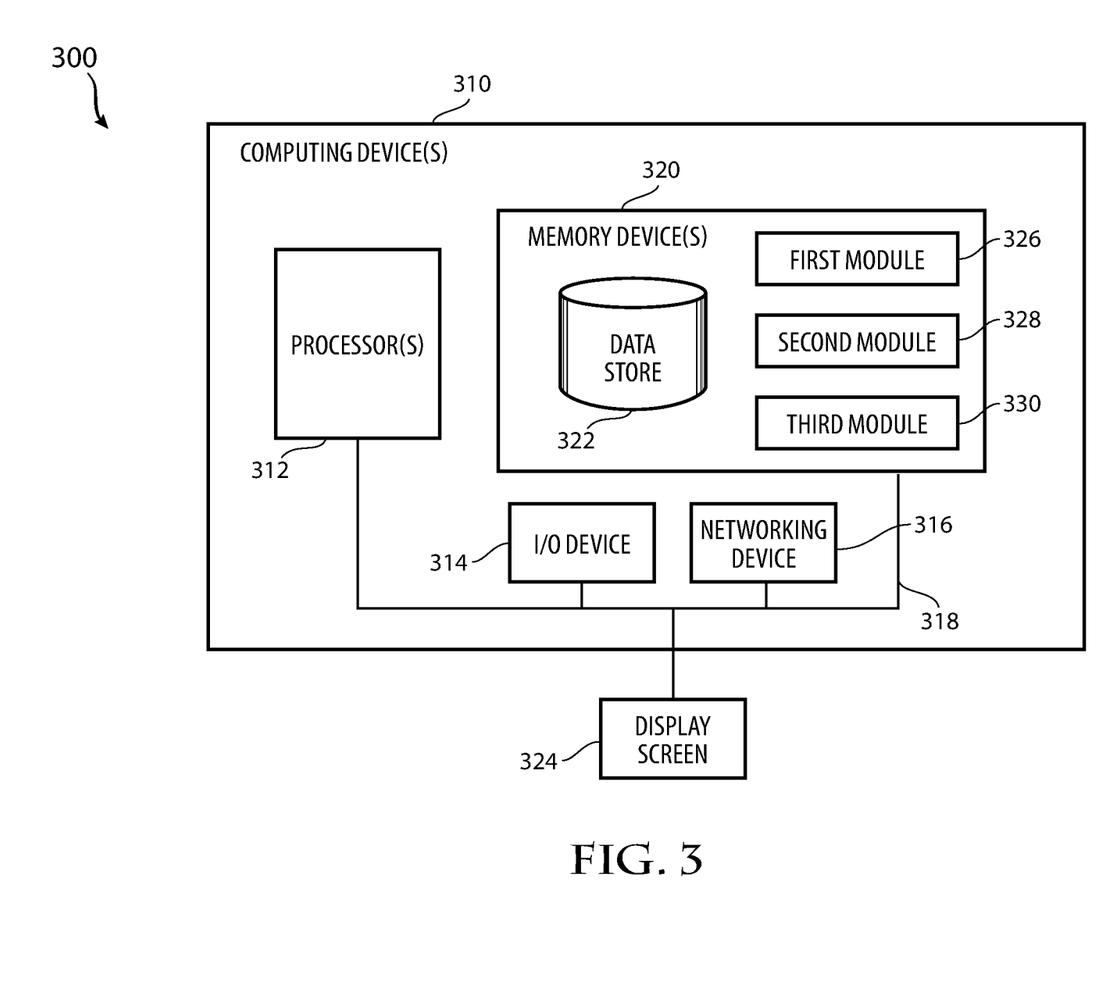
FIG. 3 illustrates an example system embodiment.

FIG. 3 illustrates a computing device 310 on which modules of this technology may execute. For example, one or more of the components shown in FIG. 3 can be used to represent hardware features of device 104, or the speech processing component 108 and/or features used for a respective domain or downstream service. A computing device 310 is illustrated on which a high level example of the technology may be executed. The computing device 310 may include one or more processors 312 that are in communication with memory devices 320. The computing device 310 may include a local communication interface 318 for the components in the computing device. For example, the local communication interface 318 can be a local data bus and/or any related address or control busses as may be desired.

The memory device 320 may contain modules that are executable by the processor(s) and data for the modules. Located in the memory device 320 are modules executable by the processor. For example, a first module 326, a second module 328, and a third module 330, as well as other modules, may be located in the memory device 320. These modules can perform operations such as speech recognition or natural language understanding, or could perform a routing decision. A data store 322 may also be located in the memory device 320 for storing data related to the modules and other applications along with an operating system that is executable by the processor(s) 312. Each module represents a combination of software programming and a hardware component to carry out program steps and does not encompass a signal per se.

The computing system 310 of FIG. 3 may be utilized for providing the trained neural networks as disclosed herein. For example, the first module 326 can be used to make predictions on user intent. The second module 328 may select a network-based domain for dialog routing. The third module 330 may rank the various hypothesis of the user intent in an utterance or may determine whether a routing is a false accept or not.

The computing device 310 may further include or be in communication with a separate device, which may include a display device or other computing device 324. The device 324 may be available for an administrator to use in interfacing with the computing device 310, such as to review operation of the system, modify rewards, make improvements to the system and so forth.

Various applications may be stored in the memory device 320 and may be executable by the processor(s) 312. Components or modules discussed in this description that may be implemented in the form of software using high programming level languages that are compiled, interpreted or executed using a hybrid of the methods. Any component can be a virtual component as well.

The computing device 310 may also have access to I/O (input/output) devices 314 that are usable by the computing devices. An example of an I/O device 314 is a display screen 324 that is available to display output from the computing devices. The I/O device 314 might represent a speech interface enabling a user to speak to a microphone and hear responsive system utterances through a speaker. Other known I/O devices may be used with the computing device as desired. Networking device 316 and similar communication devices may be included in the computing device 310. The networking device 316 may be a wired or wireless networking device 316 that connects to the internet, a LAN, WAN, or other computing network.

The components or modules that are shown as being stored in the memory device 320 may be executed by the processor 312. The term "executable" may mean a program file that is in a form that may be executed by a processor 312. For example, a program in a higher level language may be compiled into machine code in a format that may be loaded into a random access portion of the memory device 320 and executed by the processor 312, or source code may be loaded by another executable program and interpreted to generate instructions in a random access portion of the memory to be executed by a processor 312. The executable program may be stored in any portion or component of the memory device 320. For example, the memory device 320 may be random access memory (RAM), read only memory (ROM), flash memory, a solid state drive, memory card, a hard drive, optical disk, floppy disk, magnetic tape, or any other memory components.

The processor 312 may represent multiple processors and the memory 320 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped.

Some of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more blocks of computer instructions, which may be organized as an object, procedure, or function. Nevertheless, the executables of an identified module need not be physically located together, but may include disparate instructions stored in different locations which include the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Figure 4:
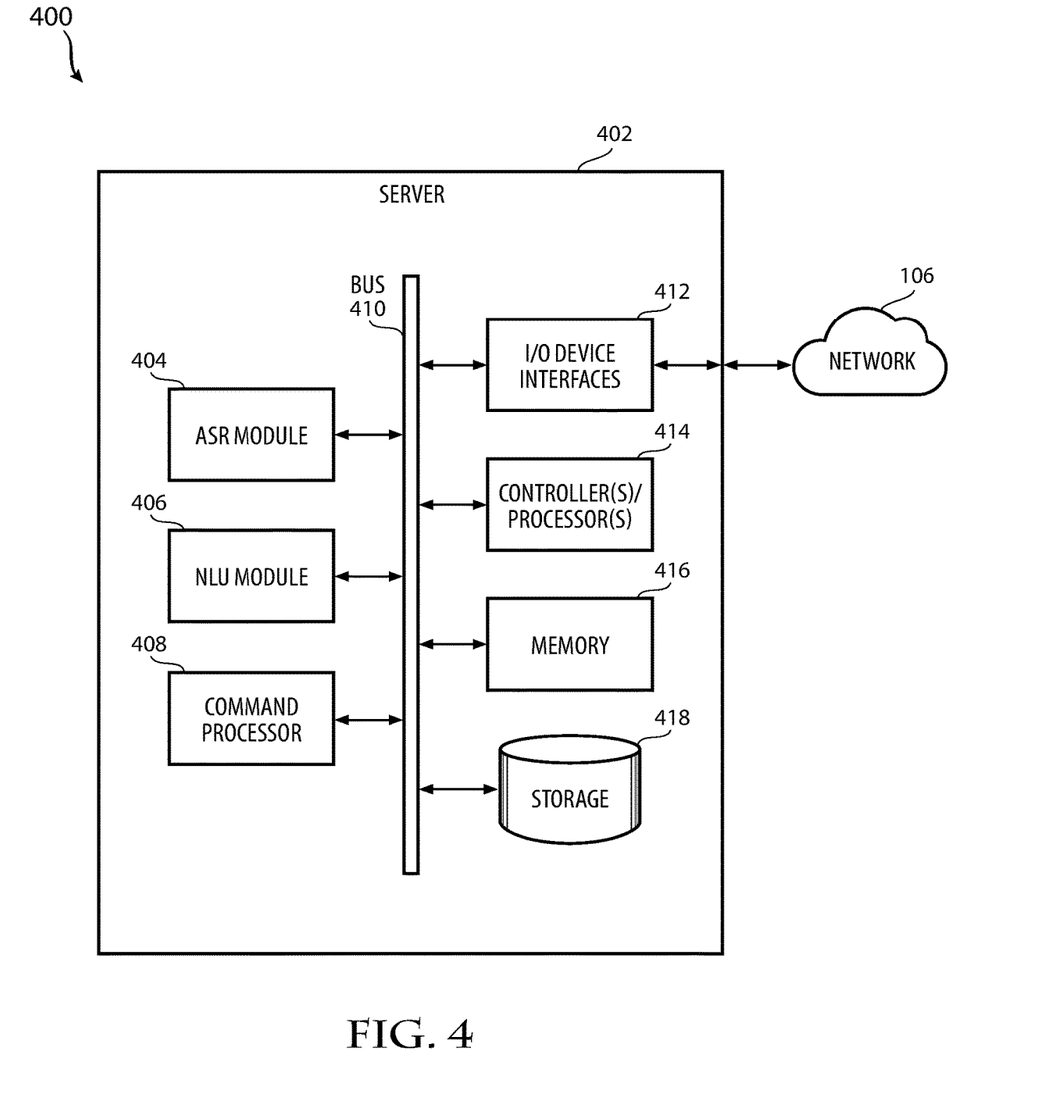
FIG. 4 illustrates an example speech processing system.

FIG. 4 illustrates an example speech processing component 108 which can be implemented as part of this disclosure. FIG. 4 is a block diagram conceptually illustrating example components a remote server 402 that may assist with ASR, NLU processing, or command processing. Server 402 may also assist in determining similarity between ASR hypothesis results as described above. Multiple such servers 402 may be included in the system, such as one server for ASR, one server for NLU, etc. In operation, each of these devices may include computer-readable and computer-executable instructions that reside on the device 402, as will be discussed further below.

The device 402 can include one or more controllers/processors 414 that may each include a central processing unit (CPU) for processing data and computer-readable instructions, and a memory 416 for storing data and instructions of the device. The memories 416 may individually include volatile random access memory (RAM), non-volatile read only memory (ROM), non-volatile magnetoresistive (MRAM) and/or other types of memory. The device may also include a data storage component 418, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through input/output device interfaces 412.

Computer instructions for operating the device 402 and its various components may be executed by the device's controller(s)/processor(s)/414, using the memory 416 as temporary "working" storage at runtime. A device's computer instructions may be stored in a non-transitory manner in non-volatile memory 416, storage 418, or an external device(s). Alternatively, some or all of the executable instructions may be embedded in hardware or firmware on the respective device in addition to or instead of software.

The device 402 includes input/output device interfaces 412. A variety of components may be connected through the input/output device interfaces, as will be discussed further below. Additionally, the device 402 may include an address/data bus 410 for conveying data among components of the device. Each component within the device 402 may also be directly connected to other components in addition to (or instead of) being connected to other components across the bus 410.

The device 402 may include an ASR module 404. The ASR module 404 may include the language models stored in ASR model storage component, and an ASR module 404 that performs the automatic speech recognition process. If limited speech recognition is included, the ASR module 404 may be configured to identify a limited number of words, such as wake words of the device, whereas extended speech recognition may be configured to recognize a much larger range of words. The ASR module 404 can include machine learning components, deterministic processes as well as non-deterministic processes to analyze speech and produce text.

The device 402 may include a limited or extended NLU module 406. The NLU module 406 may include a named entity recognition module, an intent classification module and/or other components that can be deterministic and/or non-deterministic. The NLU module 406 may also include a stored knowledge base and/or entity library, or those storages may be separately located. The device 402 may also include a command processor 408 that is configured to execute commands associate with an ASR hypothesis. The NLU module 406 will determine the meaning of the words used in the received utterances.

Multiple devices may be employed in a single speech processing system. In such a multi-device system, each of the devices may include different components for performing different aspects of the speech processing. The multiple devices may include overlapping components. The components of the devices 104 and the server 402, are exemplary, and may be located a stand-alone device or may be included, in whole or in part, as a component of a larger device or system. The device 402 of course can include one or more servers as well.

The technology described here may also be stored on a computer readable storage medium or device that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application. A computer-readable media or device does not constitute a signal per se independent of any hardware component.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Embodiments of this disclosure can be claimed from the standpoint of any component disclosed herein. Embodiments could encompass a combination of operations performs in two or more particular layers in any order. In one example, claims could be directed to a product by process in which the output of a false accept model can be the subject of a claim or the trained deep neural network model could be the subject of a claim. Claims can be developed from the standpoint of the downstream service 128 and the data received and actions taken in that environment based on a received signal indicating the detection result of the model 120/122.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
    receiving, at a shopping domain, a routing of a dialog from a speech processing component, wherein the speech processing component is engaged in the dialog with a user and wherein the speech processing component routed the dialog to the shopping domain according to a determination by the speech processing component that the user has a purchasing intent based on an analysis of a first user utterance in the dialog according to a first algorithm; and
    detecting, at the shopping domain and using a neural network model applying a second algorithm, whether the user has the purchasing intent by using the first user utterance in its entirety to yield a detection result;
    when the user has the purchasing intent based on the detection result, routing the dialog to a downstream service at the shopping domain; and
    when the user does not have the purchasing intent based on the detection result, dropping the first user utterance at the shopping domain.

2. The method of claim 1, wherein the shopping domain is selected by the speech processing component from a plurality of potential domains to which the dialog can be routed.

3. The method of claim 1, wherein dropping the first user utterance further comprises presenting a system utterance based on the detection result.

4. The method of claim 1, wherein the neural network model comprises a long short-term memory artificial recurrent neural network architecture which uses a concatenation of word-level features associated with the first user utterance and character-level features associated with the first user utterance.

5. The method of claim 1, wherein the detection result identifies an error in a natural language understanding intent output associated with the first user utterance.

6. The method of claim 1, wherein the neural network model comprises a binary classifier which predicts whether the first user utterance received at the shopping domain is associated with a shopping intent or not.

7. The method of claim 1, wherein the shopping domain calls the neural network model in order to detect whether the speech processing component produced a false accept of the first user utterance as having the purchasing intent.

8. The method of claim 1, wherein, when the user does not have the purchasing intent based on the detection result and the method comprises dropping the first user utterance at the shopping domain, the dropping of the first user utterance at the shopping domain comprises blacklisting at least a part of the first user utterance in the neural network model.

9. The method of claim 8, wherein blacklisting at least the part of the first user utterance further comprises applying a regular expression-based rule within the neural network model.

10. A system comprising:
    a processor; and
    a computer-readable storage device storing instructions which, when executed by the processor, cause the processor to perform operations comprising:
        receiving, at the system, a routing of a dialog from a speech processing component, wherein the speech processing component is engaged in the dialog with a user and wherein the speech processing component routed the dialog to the system according to a determination by the speech processing component that the user has an intent based on an analysis of a first user utterance in the dialog;
        detecting, at the system and using a neural network model, whether the user has the intent by using the first user utterance in its entirety to yield a detection result; and
        when the user has the intent based on the detection result, routing the dialog to a downstream service.

11. The system of claim 10, wherein the system is associated with a domain that is selected by the speech processing component from a plurality of potential domains to which the dialog can be routed.

12. The system of claim 10, wherein the computer-readable storage device stores further instructions which, when executed by the processor, cause the processor to perform operations further comprising:
when the user does not have the intent based on the detection result, dropping the first user utterance.

13. The system of claim 10, wherein the neural network model comprises a long short-term memory artificial recurrent neural network architecture which uses a concatenation of word-level features associated with the first user utterance and character-level features associated with the first user utterance.

14. The system of claim 10, wherein the detection result identifies an error in a natural language understanding intent output associated with the first user utterance.

15. The system of claim 10, wherein the neural network model comprises a binary classifier which predicts whether the first user utterance received at the system is associated with a first intent or not.

16. The system of claim 10, wherein the system calls the neural network model in order to detect whether the speech processing component produced a false accept of the first user utterance as having the intent.

17. The system of claim 12, wherein, the dropping of the first user utterance at the system comprises blacklisting at least a part of the first user utterance in the neural network model.

18. The system of claim 17, wherein blacklisting at least the part of the first user utterance further comprises applying a regular expression-based rule within the neural network model.

19. A method comprising:
receiving, at a domain, a routing of a dialog from a speech processing component, wherein the speech processing component is engaged in the dialog with a user and wherein the speech processing component routed the dialog to the domain according to a determination by the speech processing component that the user has an intent based on an analysis of a first user utterance in the dialog;
detecting, at the domain and using a neural network model, whether the user has the intent by using the first user utterance in its entirety to yield a detection result; and
when the user has the intent based on the detection result, routing the dialog to a downstream service within the domain.

20. The method of claim 19, wherein when the user does not have the intent based on the detection result, dropping the first user utterance.

* * * * *